United States Patent
Bhageria et al.

(10) Patent No.: US 9,957,023 B1
(45) Date of Patent: May 1, 2018

(54) PROACTIVE CONTROL OF WATERCRAFT MOVEMENT BASED ON WATER SURFACE FEATURES

(71) Applicant: INTERNATIONAL BUSINESS MACHINES CORPORATION, Armonk, NY (US)

(72) Inventors: Gopal K. Bhageria, Kolkata (IN); Rudranil D. Gupta, Kolkata (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 15/296,357

(22) Filed: Oct. 18, 2016

(51) Int. Cl.
*B63B 39/00* (2006.01)
*G01C 13/00* (2006.01)
*G05D 1/02* (2006.01)
*B63J 99/00* (2009.01)

(52) U.S. Cl.
CPC ............ *B63B 39/00* (2013.01); *G01C 13/002* (2013.01); *G05D 1/0206* (2013.01); *B63B 2205/00* (2013.01); *B63J 2099/006* (2013.01)

(58) Field of Classification Search
CPC ....... B63B 39/00; G01C 13/002; G05D 1/206
USPC .......................................................... 701/21
See application file for complete search history.

(56) References Cited

U.S. PATENT DOCUMENTS

| | | | |
|---|---|---|---|
| 9,250,329 B2 * | 2/2016 | O'Regan | G01S 5/0027 |
| 2012/0020185 A1 * | 1/2012 | Welker | G01V 1/38 367/16 |
| 2014/0114509 A1 * | 4/2014 | Venables | B63B 39/00 701/21 |

OTHER PUBLICATIONS gCaptain, Maritime and Offshore Energy Industry News blog, Forbes. "How Do Large Ships Deal With Massive Hurricanes?", [retrieved on May 25, 2016]. Retrieved from the Internet <URL: http://www.forbes.com/sites/gcaptain/2012/10/29/how-do-large-ships-deal-with-massive-hurricanes/#3d68f2a75f9b>, Oct. 29, 2012, 4 pgs.

Lister, Tim, CNN. "Ship loses more than 500 containers in heavy seas", [retrieved on May 25, 2016]. Retrieved from the Internet <URL: http://www.cnn.com/2014/02/21/world/container-ship-loses-containers/>, Feb. 22, 2014, 3 pgs.

(Continued)

*Primary Examiner* — Yazan A Soofi
(74) *Attorney, Agent, or Firm* — David Zwick; Matthew M. Hulihan; Heslin Rothenberg Farley & Mesiti PC (57) ABSTRACT

Proactive control of watercraft movement based on water surface features. A method obtains, from a plurality of floating sensors at least partially surrounding a watercraft in a body of water, information about movement of a surface of the body of water, the plurality of floating sensors being arranged in multiple sets, the floating sensors of each set of the multiple sets being interconnected by a respective tether extending from the watercraft. The method builds a surface model of the surface of the body of water based on the obtained information about movement of the surface, the surface model including indications of force and directional movement of features of the surface of the body of water, and determines, based on the surface model, at least one control maneuver for controlling movement of the watercraft.

20 Claims, 5 Drawing Sheets

(56) References Cited

OTHER PUBLICATIONS

Rahman, Kahleda, for Mailonline, DailyMail.com. "Enough to make anyone seasick: Watch the inside of a cargo ship twist and contort as it moves through huge waves in a storm", [retrieved on May 25, 2016]. Retrieved from the Internet <URL: http://www.dailymail.co.uk/news/article-2837563/Watch-inside-cargo-ship-twist-contort-moves-huge-waves-storm.html>, Nov. 17, 2014, 7 pgs.

Bowditch, Nathaniel. "The American Practical Navigator: An Epitome of Navigation", Paradise Cay Publications, 2002, Chapter 32, Waves, Breakers and Surf, pp. 441-452, 12 pgs.

Alrajeh, Nabil, Ali. "Localization Techniques in Wireless Sensor Networks", International Journal of Distributed Sensor Networks, vol. 2013 (2013), Article ID 304628. [retrieved on May 25, 2016]. Retrieved from the Internet <URL: http://www.hindawi.com/journals/ijdsn/2013/304628/abs/>, Received May 22, 2013; Accepted Jun. 15, 2013, 8 pgs.

Silva, Agnelo. "Power-Management Techniques for Wireless Sensor Networks and Similar Low-Power Communications Devices Based on Nonchargeable Batteries", Journal of Computer Networks and Communications, vol. 2012 (2012), Article ID 757291 [retrieved on May 25, 2016]. Retrieved from the Internet <URL: http://www.hindawi.com/journals/jcnc/2012/757291/>, Received Jun. 15, 2012; Accepted Aug. 22, 2012, 8 pgs.

Zhang, Hongke. "Mobile Ad-hoc and Sensor Networks", Third International Conference, MSN 2007 Beijing, China, Dec. 12-14, 2007 Proceedings, 14 pgs.

The University of Michigan Bulletin, College of Engineering 1999-2000, vol. 28., No. 8, Jun. 4, 1999, p. 135.

Al-Karaki, Jamal N. "Routing Techniques in Wireless Sensor Networks: A Survey", Dept. of Electrical and Computer Engineering, Iowa State University, undated, 37 pgs.

\* cited by examiner

PROACTIVE CONTROL OF WATERCRAFT MOVEMENT BASED ON WATER SURFACE FEATURES

BACKGROUND

When cargo ships and other marine vehicles travel in the ocean they are many times subjected to bad weather, such as a rough store. During a bad weather event, the surface of the ocean becomes dangerous and difficult to safely navigate, potentially causing serious injury to people and damage to property. Many times ocean-borne vessels are designed to withstand some of these conditions, however those conditions that are severe enough can still cause major accidents.

SUMMARY

An approach is needed for proactive notification and corrective action to address weather events and other situations that present dangerous conditions in the water across which a watercraft navigates. The solution can enable the watercraft to proactively address such a critical scenario. Additionally, because the watercraft may be transporting sensitive material, changing the alignment of the watercraft to accommodate the surface conditions, such as upcoming wave patterns, may help to orient the material to prevent or minimize loss and/or damage.

Shortcomings of the prior art are overcome and additional advantages are provided through the provision of a computer-implemented method. The method obtains, from a plurality of floating sensors at least partially surrounding a watercraft in a body of water, information about movement of a surface of the body of water. The plurality of floating sensors are arranged in multiple sets, with the floating sensors of each set of the multiple sets being interconnected by a respective tether extending from the watercraft. The method builds a surface model of the surface of the body of water based on the obtained information about movement of the surface. The surface model includes indications of force and directional movement of features of the surface of the body of water. The method determines, based on the surface model, at least one control maneuver for controlling movement of the watercraft.

Further, a computer program product including a computer readable storage medium readable by a processor and storing instructions for execution by the processor is provided for performing a method. The method obtains, from a plurality of floating sensors at least partially surrounding a watercraft in a body of water, information about movement of a surface of the body of water. The plurality of floating sensors are arranged in multiple sets, with the floating sensors of each set of the multiple sets being interconnected by a respective tether extending from the watercraft. The method builds a surface model of the surface of the body of water based on the obtained information about movement of the surface. The surface model includes indications of force and directional movement of features of the surface of the body of water. The method determines, based on the surface model, at least one control maneuver for controlling movement of the watercraft.

Yet further, a computer system is provided that includes a memory and a processor in communications with the memory, wherein the computer system is configured to perform a method. The method obtains, from a plurality of floating sensors at least partially surrounding a watercraft in a body of water, information about movement of a surface of the body of water. The plurality of floating sensors are arranged in multiple sets, with the floating sensors of each set of the multiple sets being interconnected by a respective tether extending from the watercraft. The method builds a surface model of the surface of the body of water based on the obtained information about movement of the surface. The surface model includes indications of force and directional movement of features of the surface of the body of water. The method determines, based on the surface model, at least one control maneuver for controlling movement of the watercraft.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities for proactive control of watercraft movement. Watercraft refers to any marine or water-borne mode of transport, including vehicles such as boats, ships, vessels, and submarines, as examples. Though aspects described herein are presented in the context of relative large watercraft, such as cargo ships, aspects described herein apply to watercraft of any size.

The proactive control of watercraft movement is based on building a surface model of the surface of a body of water model, which may indicate surface energy in the form of surface features such as waves, breaks, or swells, as examples. Other surface features may include objects on the surface of the body of water. The model may be built on a real-time basis, i.e. as data about surface features is obtained. The model may be used for knowledge about the predicted extent and direction of impact of surface features against the watercraft. This knowledge may be used by the watercraft's captain and/or a movement controlling system of the watercraft to proactively maneuver the watercraft into a safer position, location, orientation, alignment, or course, as examples. The maneuver may be executed manually (e.g. by a driver of the watercraft), automatically (i.e. by a movement control system of the watercraft) or a combination of the two. In some examples, the watercraft is caused to change direction, aligning the watercraft in the direction of the surface wave(s) of other feature(s) in order to minimize the impact between the watercraft and the feature.

Upon detecting a situation calling for a surface model and potential proactive maneuvering of the watercraft, floatable sensors are dispersed at least partially surrounding the watercraft to acquire data about movement of the surface of the body of water. By way of specific example, propulsion device(s), such as jet powered devices can carry/propel floatable sensor balls grouped along tethers extending away from the watercraft, dispersed on the water surface in several directions. The sensors balls grouped along a tether may be interconnected by the tether in series or in a mesh configuration, as examples. The tethering of the balls together enables them to be retrieved, for instance collected back by the ship, for reuse. The floatable sensor balls can each include one or many sensors of varying type(s), such as a location sensor (global positioning system (GPS) sensor), stress sensor, movement sensor, impact sensor, accelerometer, altimeter, pressure sensor, or the like.

Once the floatable sensor balls are deployed across the surface, they can gather various information related to sea water movements and patterns, including amounts of applied force, changes in height/altitude (upward and downward movement), impact, and any other information that could be used to model the surface of the body of water. The sensors gather information about movement of the surface of the body of water in the various locations at which the floatable sensors are present.

Information collected by a floating sensor may be transmitted either directly or through intervening devices, such as other floating sensor(s), in real-time or near real-time, to a computer system local or remote to the watercraft. In one example, the information is transmitted wirelessly or via a wire (e.g. included in the tether) back to a computer system maintained on the watercraft. A computer system receiving this collected data can then build a surface model of the surface of the body of water on a real-time basis, and accordingly can calculate the amount of water/force that is approaching the watercraft from various directions. This includes predictions about force and directional movement of surface features such as waves, swells, breaks, and objects of/on the surface of the body of water.

The built surface model may then be used to proactively manage movement of the watercraft, such as the orientation of the vessel, in order to negotiate the features, which may include wave patterns and other feature patterns.

Figure 1:
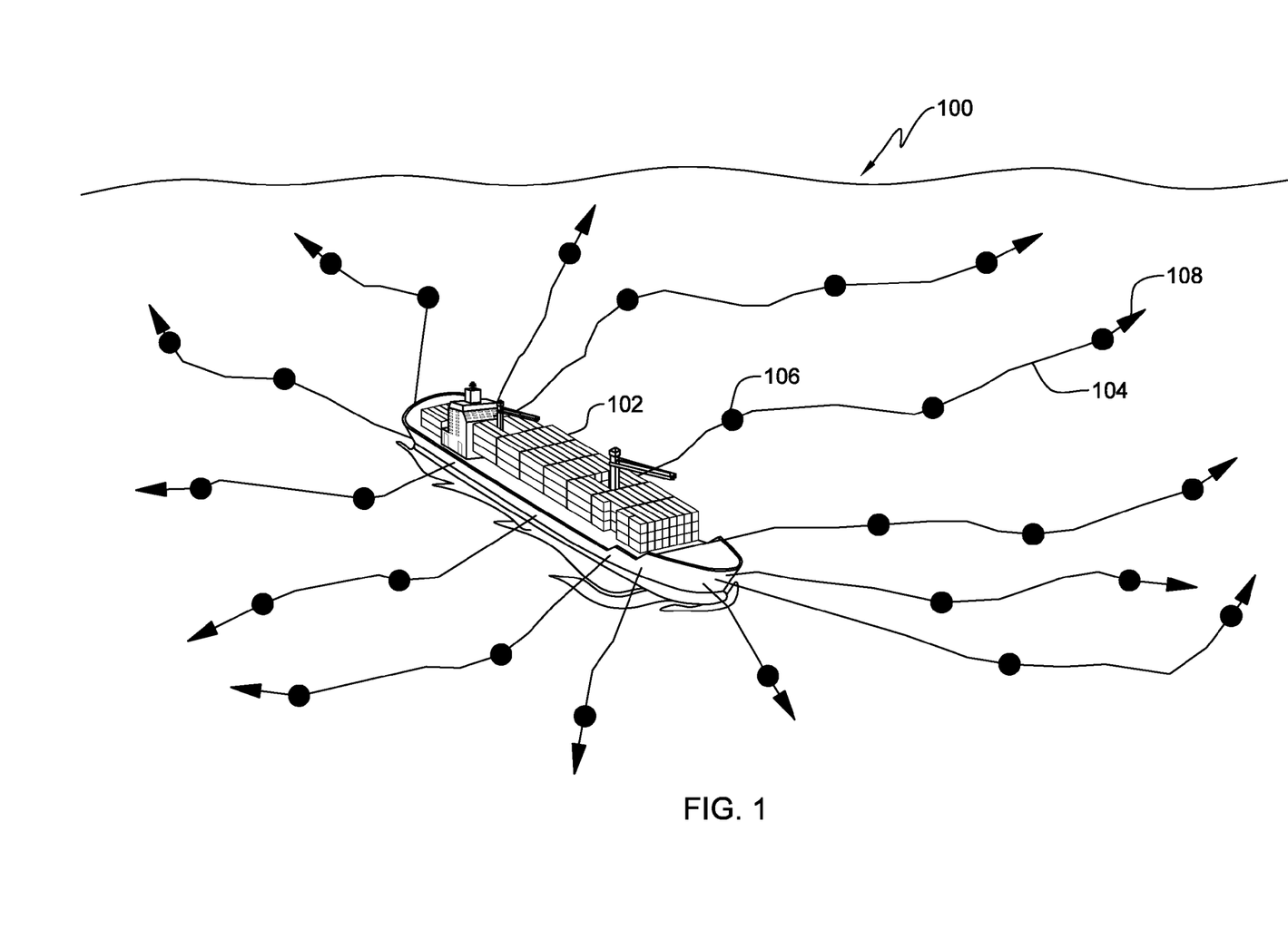
FIG. 1 depicts an example deployment of a plurality of floating sensors on a surface of a body of water, in accordance with aspects described herein.

FIG. 1 depicts an example deployment of a plurality of floating sensors on a surface of a body of water, in accordance with aspects described herein. In FIG. 1, cargo ship 102 navigates along a surface of the ocean 100. At some point the ship deploys a plurality of floatable sensor balls 106 across the surface of the ocean proximate the ship 102. The deployed sensor balls are arranged in sets, with each sets of sensor balls being interconnected by a respective tether 104. Tether can be any suitable material, such as rope, chain, wire, or the like. At the end of each tether 104 is a propulsion device 108, such as a jet powered propulsion device, that pulls an end of the tether away from the ship 102. The sensor balls are deployed based on the ship captain becoming aware of potentially difficult surface conditions such that a water surface model may be helpful. The sensor balls can be collected by reeling in the tethers and/or using the propulsion devices 108 to steer the end of the tether back to the ship.

Though the length of each tether may be any desired length and may vary in length as between each other, in some embodiments each tether ranges in length from 100 meters to 800 meters, and in particular examples the length is about 500 meters.

The propulsion devices may be energized using any desired form. In some examples they include a motor that runs on gas. Additionally or alternatively, they may harvest solar energy and/or energy from their movement caused by the currents, waves, and other features of the ocean surface. Generally speaking, the sensors balls should have enough power to power the sensor(s) and transmit the gathered data to a destination, such as the sensor balls that is the next closest along the tether to the ship, or to a received on the ship.

The sensors balls may be deployed based on receiving a weather alert. In some examples, they are deployed long enough for the sensors to gather information about surface movement from the desired locations and then are collected, though in other examples, they are kept deployed for a longer period of time, potentially traveling along the surface of the ocean with the ship (propelled using the propulsion devices in keeping the sensor balls in a substantially constant position relative to the ship).

In other examples, the sensors balls are deployed using drones (or other remote-controlled aerial devices), where an end of the tether is coupled to the drone and the drone flies away from the ship pulling the tether with it to distribute the sensor balls.

Accordingly, an example process is as follows:

Multiple sensor balls are connected to a string or other tether. The balls can have motion sensor(s), stress sensor(s), GPS sensor(s), accelerometer(s), and/or any other appropriate sensors. Location devices such as GPS sensor(s) enable pinpointing the position of each sensor ball, enabling the data retrieved therefrom regarding surface movement to be correlated to that position. Spacing between the balls of a tether may be substantially constant (e.g. within about 5% distance). A propulsion device such as a powered jet is fixed at an end of each tether and used to distribute the sensors balls of the tether. This is duplicated for multiple tethers and sets of sensor balls, extending in different directions away from the watercraft.

During any critical localized storm, other weather event, or any time a surface model is desired, the propulsion devices will carry the interconnected sensors balls with the tethers to lay the sensor balls on the water surface in an area. The propulsion devices can ensure that the relative distance and direction of the sensor balls remains substantially consistent. If the sensors are (at least roughly) evenly spaced along the tether, the propulsion device can maintain enough pull force on the tether to keep a rough equal spacing between the sensors. Consequently, the relative position of the sensors may be maintained, i.e. to counteract relative changes in position that might otherwise be caused based on ocean waves and other forces. In other words, a proper distribution of the sensor balls may be maintained at least in part by the propulsion devices, to help avoid congestion of the sensors that might otherwise result from environmental forces. Thus, based on feature direction and force, the propulsion devices can apply the appropriate pull force to ensure the sensor balls are in the desired locations relative to each other and to the ship. The propulsion devices may operate in a pusher (rear) configuration, tractor (front) configuration, and/or by waterjet propulsion, as examples.

Because the tethers extend roughly radially away from the ship, the distance between tethers and therefore the sensors along each tether may increase with increased distance from the ship.

After the information about the movement of the water surface at the locations of the sensors is collected, software can create a mesh-type surface model of the ocean surface. The gathered data can be transmitted from the sensors balls to the ship. The model can indicate surface features, enabling creation of a force diagram.

Figure 2:
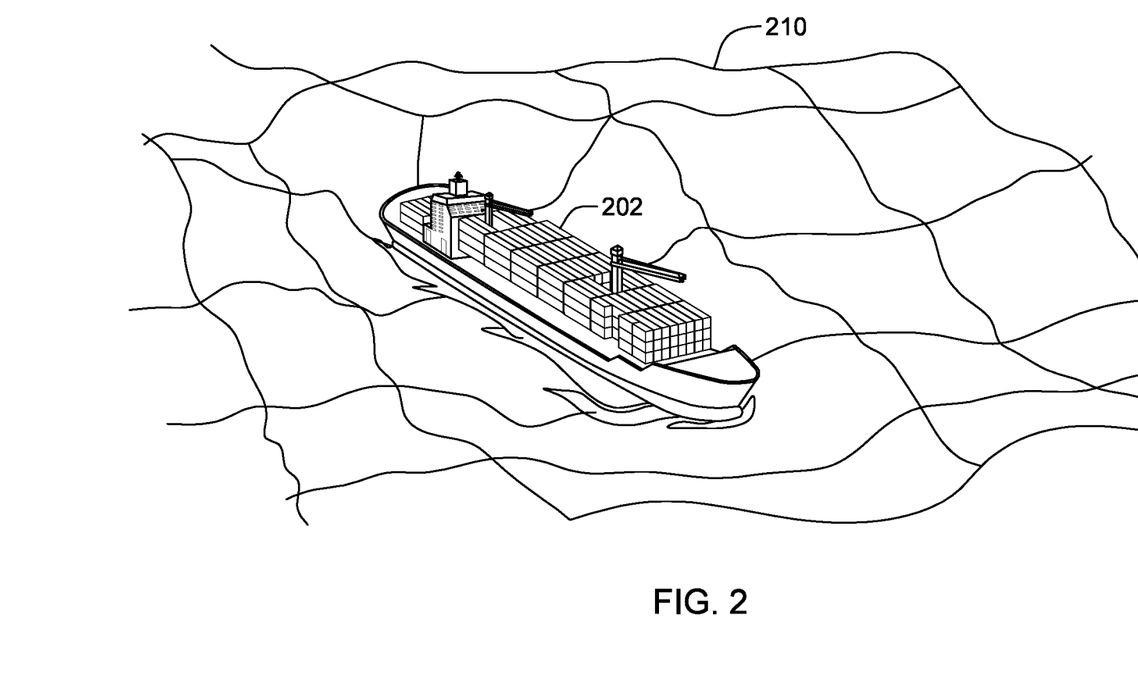
FIG. 2 depicts an example surface model of the body of water based on obtained information about movement of the surface of the body of water, in accordance with aspects described herein.

FIG. 2 depicts an example surface model of the body of water based on obtained information about movement of the surface of the body of water, in accordance with aspects described herein. The model 210 is shown along with a depiction of the ship 202. The water surface model can be created on a real-time basis, and used to estimate a direction, location, and extent (magnitude, amount, etc.) of an anticipated (e.g. within the next few minutes) impact to the watercraft. Using that estimate, the ship has time to proactively control movement of the ship in a manner that best addresses the anticipated impact, for instance by changing orientation and/or route of the watercraft.

In it noted that the intersection of the lines of the model in FIG. 2 may or may not correspond to the locations of the sensors balls. In some examples, the data comes from the positions depicted in FIG. 1, providing enough data to extrapolate values to crease the grid-like model depicted in FIG. 2. That is, it is possible to sample data from multiple locations surrounding the ship and extrapolate values in areas that were sampled, to create contour lines that form the mesh-type model. Alternatively, the model may depict only actual values gathered at the actual locations of the floating sensors.

Once the surface model is built, the model may be analyzed manually (by a person such as a crew member of the watercraft, automatically by software of a local or remote computer system, or a combination of the two. The analysis can inform control maneuver(s) for controlling movement of the watercraft in a desired (e.g. safe) way. The maneuvers/movements can be automatically performed, for instance by sending commands to a movement controlling system of the watercraft or by updating a course of the watercraft through the water, and/or manually performed, for instance by manually steering the watercraft. In some examples, the maneuvers control the ship in such a way that the effects of an impact are minimized.

The watercraft may continuously or periodically receive radio messages and alerts from satellite(s) or other sources. Some such alerts may inform of rough weather or other conditions that would affect navigation of the watercraft. As soon as bad weather is identified with a defined threshold criterion (as an example), and alert may be provided to the watercraft and received. At that point or sometime thenafter, the floatable sensors may be automatically or manually deployed. Thus, the sensors may be deployed based on detecting a potentially dangerous condition of the body of water that the watercraft is approaching. In other examples, the prediction of a weather event may be received from a system of the watercraft itself, such as a system of the watercraft that predicts weather events, e.g. based on environmental data.

Each of the floating sensor balls, using the sensors thereof, can gather data and provide it to the watercraft. A computer system of the watercraft, remote computer system(s), and/or a combination of the two builds a surface model. In particular embodiments there could feedback from the computer system(s) back to the propulsion devices to direct them to move the tethers in order to position the sensor balls interconnected by that tether in different locations for data collection from targeted specific locations on the surface. This may be used to fill in areas of the surface model that could benefit from additional data.

In some examples, the sensors interact with each other using wireless communication to pass collected data back to the watercraft. For instance, a given floating sensor may provide its collected data to an adjacent floating sensor, along the tether, closer to the watercraft. Any data received from an upstream floating sensor can also be provided to that adjacent floating sensor. This can repeat, with each floating ball passing collected information to a next closer floating sensor on the tether until the floating sensor nearest the watercraft finally provides the data to the watercraft computer system.

In cases where the floating sensors remain deployed and are not maintained in their position with respect to the watercraft as the watercraft travels, the watercraft can obtain updated information from the nearest floating sensors.

In order to ascertain a proper maneuver of the vessel to, e.g., align itself from an upcoming uneven wave structure, adequate time should be afforded for the vessel to execute the maneuver before arrival of that surface feature. In some examples, at least 5 minutes is given. Distance of the floating sensors from the watercraft is a key factor in providing adequate response time. Tether length can be tailored based on the average speed of waves and velocity of the watercraft. The average speed of waves may be 1 meter per second. Assuming a stationary watercraft, a tether length of 500 meters provides more than 8 minutes response time for the watercraft to execute the maneuver(s) in time for the arrival of the wave. If the watercraft is heading toward features that are approaching the watercraft at their own speed, then the arrival time will be shorter. In any case, the distance to which the tethers extend from the watercraft may be tailored according to travel speed of the watercraft and/or the features in the water.

Advantageously, proactive control of watercraft movement based on surface features is provided to address changing surface conditions. The approach measures current surface properties and builds a surface model that is then analyzed to inform proactive movements to reduce negative effects of encountering surface features. By measuring surface conditions on-demand, the surface model reflects an accurate model of the surface at that time, which would account for the dynamic nature of surface force patterns.

Figure 3:
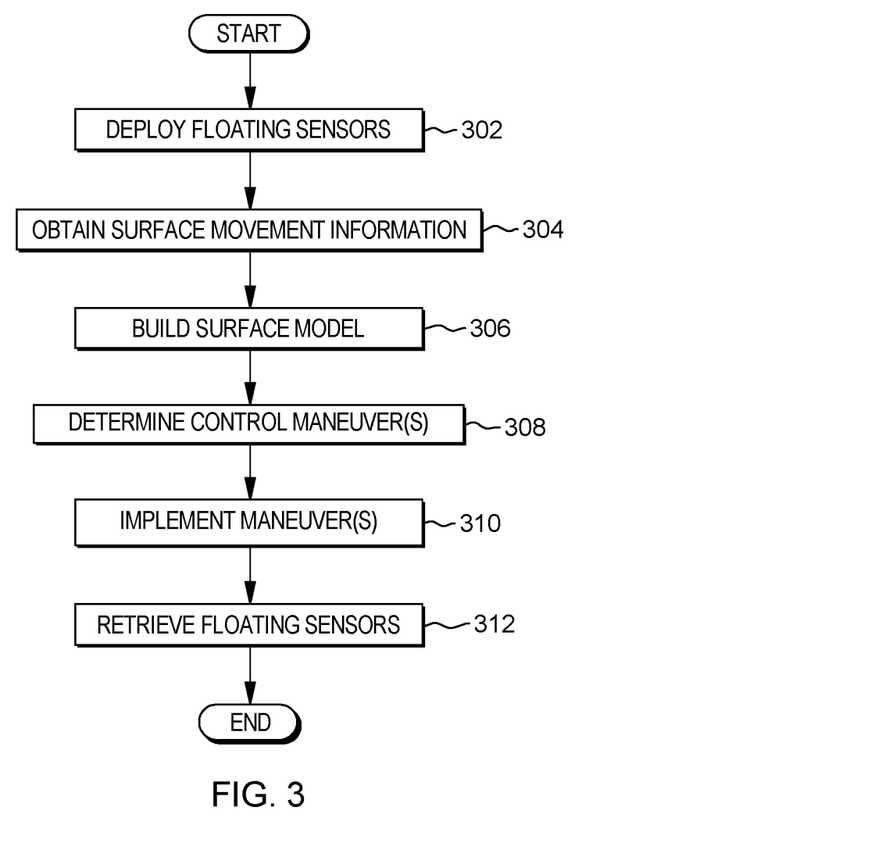
FIG. 3 depicts an example process for proactive control of watercraft movement, in accordance with aspects described herein.

FIG. 3 depicts an example process for proactive control of watercraft movement, in accordance with aspects described herein. Aspects of the process of FIG. 3 may be performed by one or more computer system(s), such as a computer system installed on a watercraft, a remote computer system in communication with such a computer system, or a combination of the two, as examples. Aspects of the process of FIG. 3 may be performed manually, e.g. by a person. Additionally or alternatively, aspects of the process of FIG. 3 may be performed in part manually and in part by one or more computer systems.

The process begins by deploying a plurality of floating sensors at least partially surrounding a watercraft in a body of water (302). The sensors may float on or at the surface of the body of water. The plurality of floating sensors may be arranged in multiple sets, with the floating sensors of each set of the multiple sets being interconnected by a respective tether extending from the watercraft. The floating sensors of a set of the multiple sets may be substantially evenly spaced along the tether interconnecting the floating sensors of the set. The deploying can deploy the floating sensors of a set of the multiple sets using a propulsion device attached to an end of the tether interconnecting the floating sensors of the set. The propulsion device can propel the floating sensors of the set outwardly from the watercraft to space the floating sensors of the set in series extending away from the watercraft.

The deploying may be based on receiving a prediction of a potentially damaging weather event to which the watercraft is predicted to be subjected. In some embodiments, the prediction is received from a remote base station, for instance as an alert. Additionally or alternatively, the prediction may be predicted by a weather event prediction system of the watercraft.

The deploying may be performed manually, e.g. by one or more people on the watercraft. Alternatively, the deploying may be automated, e.g. by controlling machines that cause the sensors to be deployed and/or by controlling the propulsion devices or drones that deploy the sensors. Additionally or alternatively, the deploying may refer to a computer system initiating a deployment, which may be a manually performed or automatically performed deployment.

The process of FIG. 3 continues by obtaining, from the plurality of floating sensors, information about movement of the surface of the body of water (304). The plurality of floating sensors can include floating ball-shaped structures, with each floating ball-shaped structure having included therein a positioning sensor, such as a GPS sensor, obtaining data indicating a position of the floating ball-shaped structure, and a sensor obtaining data indicating at least one information type. Example such information types include, but are not limited to, acceleration of the floating ball-shaped structure, impact against the floating ball-shaped structure, force applied to the floating ball-shaped structure, and upward movement of the floating ball-shaped structure.

As part of obtaining the information, the spacing of the floating sensors of the set relative to each other and the watercraft may be substantially maintained (e.g. within some percentage of variation, such as 10%) as the floating sensors of the set collect the information about the movement of the surface of the body of water adjacent to the floating sensors of the set.

The process the builds a surface model of the surface of the body of water based on the obtained information about movement of the surface (306). The surface model can include indications of force and directional movement of features of the surface of the body of water. Based on the built surface model, the process determines at least one control maneuver for controlling movement of the watercraft (308). The at least one control maneuver can include a proactive maneuver of the watercraft prior to encountering at least one feature indicated by the surface model.

As an example of determining the at least one control maneuver, the process may use the surface model to predict direction and extent of an anticipated impact to the watercraft by at least one feature indicated by the surface model, and determine an automated or manual control maneuver of the at least one control maneuver for the watercraft to brace for the at least one feature. Example such automated or manual control maneuvers include, but are not limited to: changing an orientation of the watercraft in the body of water, and changing a course of the watercraft through the body of water.

The process then implements the at least one control maneuver (310). The implementation may be manually performed, automatically performed, or a combination of the two, as examples. In a particular example, the maneuver(s) are automatically implemented using a movement controlling system of the watercraft.

Based on obtaining the information, the process can retrieve the deployed plurality of floating sensors of the multiple sets (312) using each respective tether, e.g. by reeling the tether in to collect the sensors, and maintain sensors for future reuse in a future deployment and data collection. Though depicted at the end of the process in FIG. 3, the sensors may be retrieved at any desired point, for instance before or during the surface model building.

The retrieval may be performed manually, e.g. by one or more people on the watercraft. Alternatively, the deploying may be automated, e.g. by controlling machines that cause the sensors to be retrieved and/or by controlling the propulsion devices or drones that deploy the sensors to cause the sensors to return to the watercraft. Additionally or alternatively, the retrieval may refer to a computer system initiating a retrieval, which may be a manually performed or automatically performed retrieval.

Described herein are facilities providing proactive control of watercraft movement based on water surface features. Processes described herein may be performed singly or collectively by one or more computer systems, such as computer system(s) described below with reference to FIG. 4. In some embodiments, such a computer system may be housed on a watercraft or may be in communication with a computer system of a watercraft, as examples.

Figure 4:
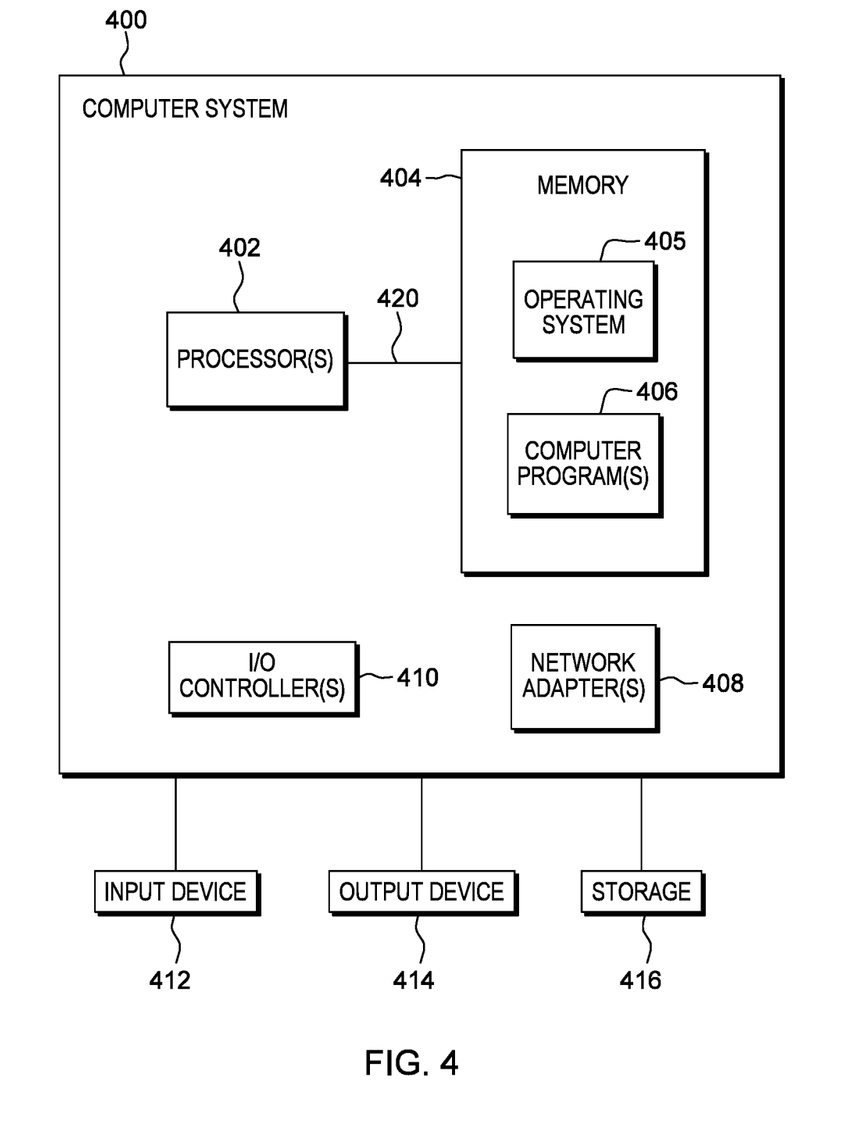
FIG. 4 depicts an example of a computer system to incorporate or use aspects described herein.

FIG. 4 depicts one example of a computer system to incorporate or use aspects described herein. A computer system may also be referred to herein as a data processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance software to perform aspects described herein, such as one or more of those described with reference to FIG. 3.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapter(s) 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer systems.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may be or include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
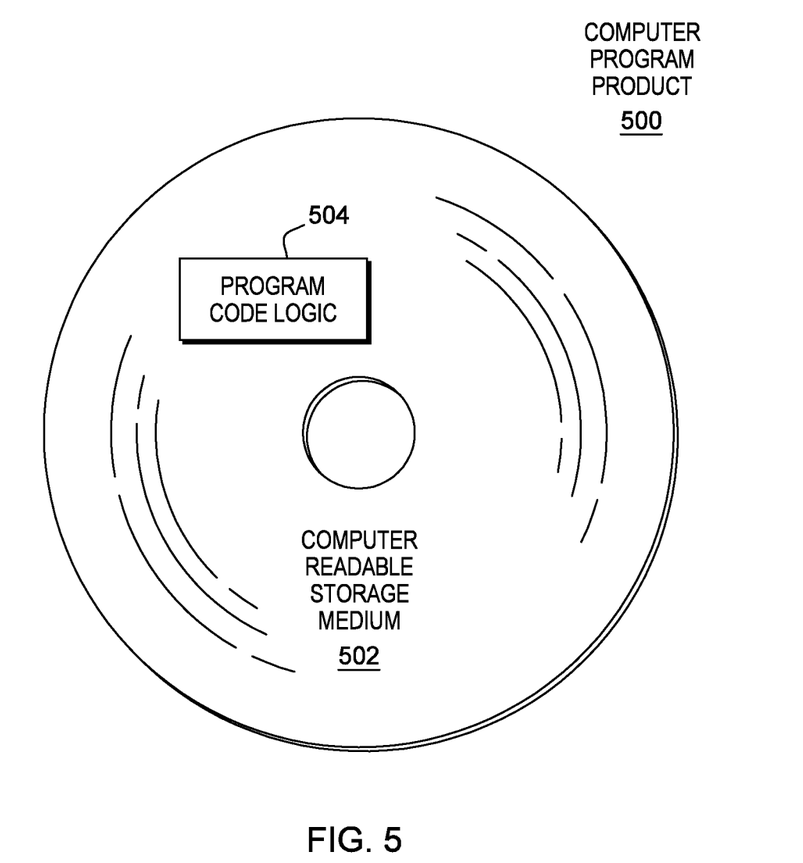
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
    obtaining, from a plurality of floating sensors at least partially surrounding a watercraft in a body of water, information about movement of a surface of the body of water, the plurality of floating sensors being arranged in multiple sets, wherein the floating sensors of each set of the multiple sets are interconnected by a respective tether extending from the watercraft;
    building a surface model of the surface of the body of water based on the obtained information about movement of the surface, the surface model including indications of force and directional movement of features of the surface of the body of water; and
    determining, based on the surface model, at least one control maneuver for controlling movement of the watercraft.

2. The method of claim 1, further comprising deploying the plurality of floating sensors.

3. The method of claim 2, wherein the deploying deploys the floating sensors of a set of the multiple sets using a propulsion device attached to an end of the tether interconnecting the floating sensors of the set, the propulsion device propelling the floating sensors of the set outwardly from the watercraft to space the floating sensors of the set in series extending away from the watercraft.

4. The method of claim 3, further comprising substantially maintaining spacing of the floating sensors of the set relative to each other and the watercraft as the floating sensors of the set collect information about movement of the surface of the body of water adjacent to the floating sensors of the set.

5. The method of claim 2, wherein the deploying is based on receiving a prediction of a potentially damaging weather event to which the watercraft is predicted to be subjected, the prediction being received from at least one of the group consisting of: a remote base station, and weather event prediction system of the watercraft.

6. The method of claim 2, further comprising, based on obtaining the information, retrieving the deployed plurality of floating sensors of the multiple sets using each respective tether, and maintaining the plurality of floating sensors for future reuse.

7. The method of claim 1, wherein the floating sensors of a set of the multiple sets are substantially evenly spaced along the tether interconnecting the floating sensors of the set.

8. The method of claim 1, wherein the plurality of floating sensors comprises floating ball-shaped structures, each floating ball-shaped structure having included therein a positioning sensor obtaining data indicating a position of the floating ball-shaped structure and a sensor obtaining data indicating at least one information type selected from the group consisting of: acceleration of the floating ball-shaped structure, impact against the floating ball-shaped structure, force applied to the floating ball-shaped structure, and upward movement of the floating ball-shaped structure.

9. The method of claim 1, wherein the at least one control maneuver comprises a proactive maneuver of the watercraft prior to encountering at least one feature indicated by the surface model.

10. The method of claim 1, wherein the determining the at least one control maneuver comprises:
    using the surface model to predict direction and extent of an anticipated impact to the watercraft by at least one feature indicated by the surface model; and
    determining an automated or manual control maneuver of the at least one control maneuver for the watercraft to brace for the at least one feature.

11. The method of claim 10, wherein the automated or manual control maneuver is selected from the group consisting of: changing an orientation of the watercraft in the body of water, and changing a course of the watercraft through the body of water.

12. The method of claim 1, further comprising automatically implementing the at least one control maneuver using a movement controlling system of the watercraft.

13. A computer program product comprising:
    a computer readable storage medium readable by a processor and storing instructions for execution by the processor for performing a method comprising:
        obtaining, from a plurality of floating sensors at least partially surrounding a watercraft in a body of water, information about movement of a surface of the body of water, the plurality of floating sensors being arranged in multiple sets, wherein the floating sensors of each set of the multiple sets are interconnected by a respective tether extending from the watercraft;
        building a surface model of the surface of the body of water based on the obtained information about movement of the surface, the surface model including indications of force and directional movement of features of the surface of the body of water; and
        determining, based on the surface model, at least one control maneuver for controlling movement of the watercraft.

14. The computer program product of claim 13, wherein the method further comprises deploying the plurality of floating sensors.

15. The computer program product of claim 14, wherein the deploying deploys the floating sensors of a set of the multiple sets using a propulsion device attached to an end of the tether interconnecting the floating sensors of the set, the propulsion device propelling the floating sensors of the set outwardly from the watercraft to space the floating sensors of the set in series extending away from the watercraft.

16. The computer program product of claim 15, wherein the method further comprises substantially maintaining spacing of the floating sensors of the set relative to each other and the watercraft as the floating sensors of the set collect information about movement of the surface of the body of water adjacent to the floating sensors of the set.

17. The computer program product of claim 13, wherein the plurality of floating sensors comprises floating ball-shaped structures, each floating ball-shaped structure having included therein a positioning sensor obtaining data indicating a position of the floating ball-shaped structure and a sensor obtaining data indicating at least one information type selected from the group consisting of: acceleration of the floating ball-shaped structure, impact against the floating ball-shaped structure, force applied to the floating ball-shaped structure, and upward movement of the floating ball-shaped structure.

18. A computer system comprising:
   a memory; and
   a processor in communications with the memory, wherein the computer system is configured to perform a method, the method comprising:
      obtaining, from a plurality of floating sensors at least partially surrounding a watercraft in a body of water, information about movement of a surface of the body of water, the plurality of floating sensors being arranged in multiple sets, wherein the floating sensors of each set of the multiple sets are interconnected by a respective tether extending from the watercraft;
      building a surface model of the surface of the body of water based on the obtained information about movement of the surface, the surface model including indications of force and directional movement of features of the surface of the body of water; and
      determining, based on the surface model, at least one control maneuver for controlling movement of the watercraft.

19. The computer system of claim 13, wherein the method further comprises deploying the plurality of floating sensors, wherein the deploying deploys the floating sensors of a set of the multiple sets using a propulsion device attached to an end of the tether interconnecting the floating sensors of the set, the propulsion device propelling the floating sensors of the set outwardly from the watercraft to space the floating sensors of the set in series extending away from the watercraft.

20. The computer system of claim 19, wherein the method further comprises substantially maintaining spacing of the floating sensors of the set relative to each other and the watercraft as the floating sensors of the set collect information about movement of the surface of the body of water adjacent to the floating sensors of the set.

\* \* \* \* \*